United States Patent
Sokolov et al.

[15] 3,686,933
[45] Aug. 29, 1972

[54] MATERIAL TESTER

[72] Inventors: Anatoly Danilovich Sokolov, ulitsa Artema, 39, kv. 69, Lvov; Nikolai Nikiforovich Danilkin, ulitsa Sedora, 5, kv.4, Tula; Ivan Fedorovich Kanavets, ulitsa 14, korpus 1, kv. 89, Moscow, all of U.S.S.R.

[22] Filed: Oct. 28, 1969

[21] Appl. No.: 870,050

[52] U.S. Cl. ................................73/101, 73/15.6
[51] Int. Cl. ................................G01n 3/24
[58] Field of Search................73/101, 59, 60, 15.6

[56] References Cited

UNITED STATES PATENTS

| | | | |
|---|---|---|---|
| 2,037,529 | 4/1936 | Mooney | 73/101 |
| 3,182,494 | 5/1965 | Beatty et al. | 73/101 |
| 3,488,992 | 1/1970 | Veith et al. | 73/15.6 |
| 3,494,172 | 2/1970 | Juve et al. | 73/101 |
| 3,501,948 | 3/1970 | Spitsbergen | 73/101 |
| 3,513,693 | 5/1970 | Porter | 73/101 |
| 3,538,758 | 11/1970 | Karper et al. | 73/101 |

*Primary Examiner*—Richard C. Queisser
*Assistant Examiner*—Marvin Smollar
*Attorney*—Waters, Roditi, Schwartz & Nissen

[57] ABSTRACT

A material tester, particularly a tester for measuring the plasticity and curing speed of plastic materials, comprises a plunger mould with a device for developing pressure in the mould and a rotor, connected with a torquemeter. The mould contains cavities, filled with the material to be tested, one being used for determining the technological properties of the material, while samples are simultaneously moulded in others for their subsequent service testing.

3 Claims, 1 Drawing Figure

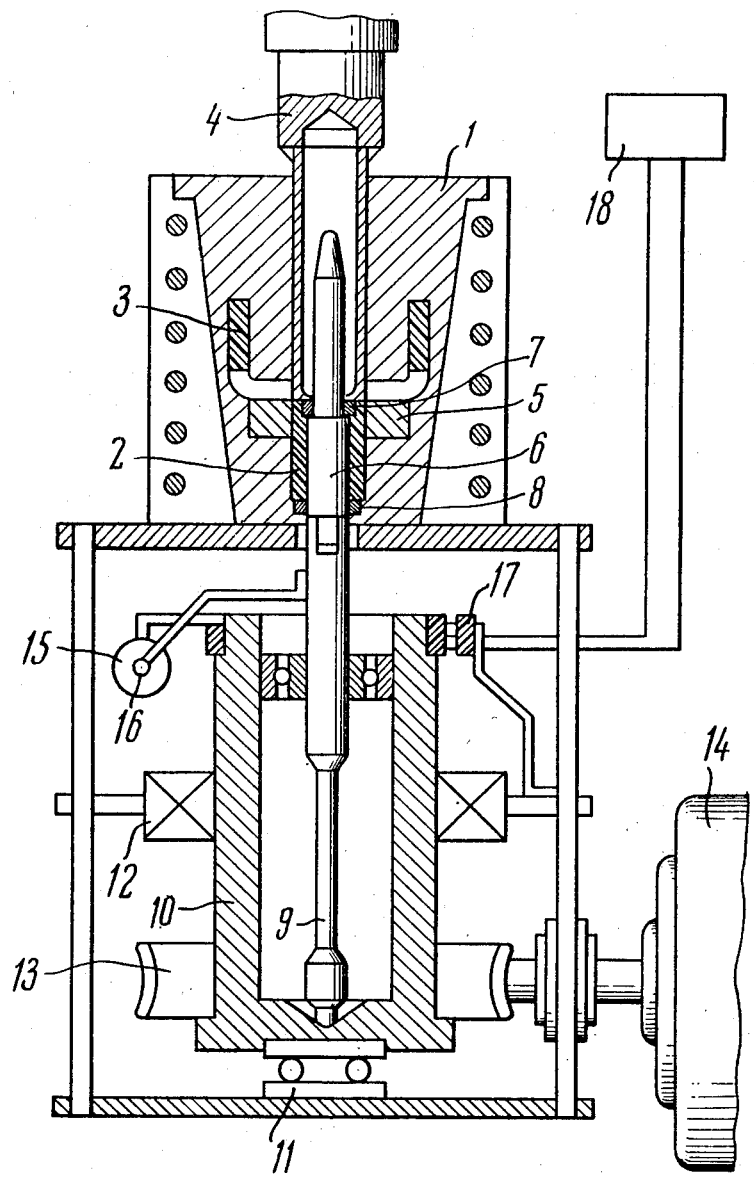

MATERIAL TESTER

The present invention relates to material testers and more specifically it relates to testers for determining technological properties of materials, for example, plasticity and curing speed of plastic materials with the simultaneous moulding in said tester of samples for the subsequent service testing.

Known in the art is a plasticity and curing speed tester comprising a plunger mould filled with the material to be tested, a device for building up pressure to be applied to the tested material, said device being made in the form of a press with a die, a rotor immersed into the tested material and a torquemeter.

In said tester, the study of technological properties of materials is carried out with the breaking of the sample by shear deformation.

The above-said tester cannot be used for a simultaneous moulding of samples from the tested material for the following testing of their service properties. Such samples are moulded in a separate plunger mould and practically it is very difficult to provide identical conditions for moulding separate samples for service testing and separate samples for technological testing. But it is very important for the production of plastic materials to establish the correlation between technological properties of the material, determining processing regimes, and the service properties of the manufactured articles.

An imperative requirement for said tester is also the provision of a powerful device for building up a high pressure to be applied to the tested material since thermosetting plastics are tested at high specific pressures.

A high pressure transmitted during the test to the torquemeter is determined as a product of the specific pressure in the tested material and the cross-sectional area of the rotor pin. This calls for the use in the torquemeter of a flexible spindle with a larger diameter which, in turn, reduces the sensitivity and measuring accuracy of the tester. The measuring accuracy is also reduced owing to the fact that the rate of shear of the tested material for the spherical portion of the rotor pin is not constant from its axis to the periphery.

In said tester the rotor pin rotates in the mould on one support only (a sliding contact bearing in the lower part of the mould) which is not sufficient, so that the upper end of the pin may have a run-out thus causing changes in the working gap between the pin and the mould, which also reduces the tester accuracy.

Additionally, in the known tester the die acts on the tested material directly over its cross-sectional area which calls for increasing the press capacity and raises the cost of the entire instrument.

An object of the present invention is to provide a tester eliminating the aforesaid disadvantages.

The main object of the invention resides in providing a tester for determining technological properties of materials, for example, plasticity and curing speed of plastic materials with the simultaneous moulding from the same material of samples for subsequent service testing, with a higher sensitivity and accuracy and of more simple design.

This object is achieved by providing a tester comprising a plunger mould with cavities filled with the materials to be tested for technological properties, a device for building up pressure to be applied to the tested material, a rotor immersed into the material under test, and a torquemeter in which, according to the invention, the working portion of the device for building up pressure in the mould is provided with additional cavities along the perimeter, and simultaneous with the technological testing of the material in the main cavities of the mould, samples are formed in said additional cavities from the same material for subsequent service testing.

It is expedient to make the working part of the device for building up pressure in the plunger mould in a form of a hollow spindle while the upper end of the rotor is elongated and serves a guide when the rotor enters the space inside the spindle during the moulding of the tested material.

The instrument realized in compliance with the present invention is successfully used for the achievement of the above-mentioned objects since it allows more accurate determination of the technological properties of polymeric materials, as regard with operation properties, and, besides, such instrument allows a reduction in the axial pressure applied to the flexible element of the torquemeter, eliminates the run-out of the rotor pin and has a simple design.

The invention will become apparent from the description of the tester according to the invention with reference to the accompanying drawing, the sole figure of which is a sectional view of the a tester for determining plasticity and curing speed of plastic materials and for moulding of samples for the subsequent service testing.

The tester comprises a heated split mould 1 with main cavities 2 filled with material for technological tests, additional cavities 3 to mould samples of the same material for the subsequent service testing, and a device for developing pressure in mould 1, the working portion of which device is made in the form of a hollow spindle 4, connected to a drive for its axial movement (omitted in the drawing). The tester further comprises a bearing 5, a rotor in the form of a cylindrical pin 6, rotating in upper and lower sliding contact bearings 7 and 8, and a torquemeter in the form of a flexible spindle 9, one end of which is connected with pin 6 while the other end is connected to a sleeve 10 mounted in bearings 11 and 12, said spindle being rotated by an electric motor 14 via worm gear 13.

The tester has a variable inductor whose coil 15 is secured on sleeve 10 while a core 16 in coil 15 is rigidly connected with pin 6. Sleeve 10 also carries a current collector 17 transmitting a signal to an automatic recorder 18.

It can be seen from the drawing that the upper part of pin 6 is elongated and serves as a guide for directing when it enters the space in spindle 4 at the moment of the moulding the material being tested.

The tester functions as follows.

The material to be tested is placed into mould 1 and is pressed by the hollow spindle 4 into the main cavity 2, formed by the inner walls of mould 1 and the cylindrical pin 6, and into additional cavities 3.

Without reducing the pressure on the tested material, motor 14 is actuated thus rotating pin 6 via the worm gear 13, sleeve 10 and flexible spindle 9. Pin 6 rotates in the sliding contact bearings 7 and 8. The torsional resistance to shear of the tested material causes the flexible spindle 9 to rotate relative to sleeve 10 through an angle proportional to this torque and is measured by a relative displacement of coil 15 and core 16 and recorded by the automatic recorder 18 in accordance with the signals sent by the current collector 17.

In the course of technological testing of the material other samples are moulded of the same material in additional cavities 3 to be later removed from the split mould 1 and subjected to service testing.

Thus, the described instrument makes it possible not only to determine the technological properties of the tested material, but to simultaneously mould therein samples for subsequent service testing and to determine more accurately the dependence between their characteristics.

Additionally, said instrument makes it possible to determine changes in technological properties of materials depending on the moulding method (pressing or pressure casting).

What is claimed is:

1. A material tester for plastic materials, said tester comprising: a plunger mould provided with a main cavity filled with a material to be subjected to physical testing, and additional cavities filled with the same material and in which, simultaneously with the physical testing of the material, additional samples are moulded under non-shear conditions for subsequent testing: means for developing pressure in said mould including a working member which is introduced to an operative position into said mould when the material is being moulded, said working member including means establishing said main and additional cavities by blocking communication between the main and additional cavities when the working member is in the operative position in said mould; rotor means extending into said mould in engagement with the material in the main cavity and isolated from the material in the additional cavities by virtue of the blocking means on said working member; and a torquemeter connected with said rotor means to measure the resistance to rotation applied thereto by the material in the main cavity, thereby providing identically cured specimens for subsequent tests that have not been subjected to shearing.

2. A tester as claimed in claim 1 in which said working member comprises a hollow spindle, said rotor means comprising a body having an upper part which is elongated and tapered to serve as a guide for entry of the rotor means into said spindle during moulding of the material to be tested.

3. A tester as claimed in claim 2 wherein said main cavity of said mould is cylindrical and said rotor means comprises a section of cylindrical shape fitted in said mean cavity of said mould to define an annular space therewith, said material being moulded in said space.

* * * * *